UNITED STATES PATENT OFFICE.

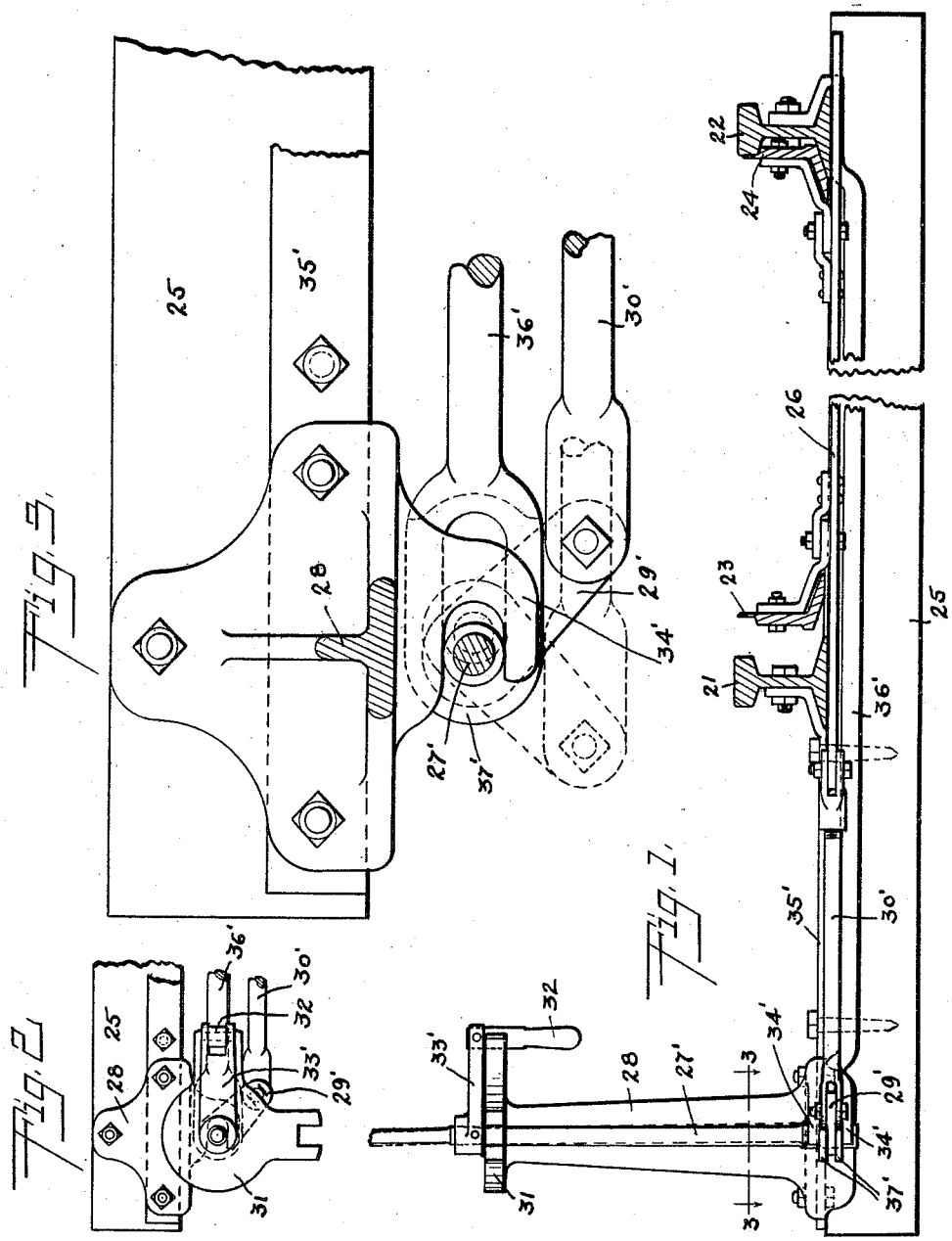

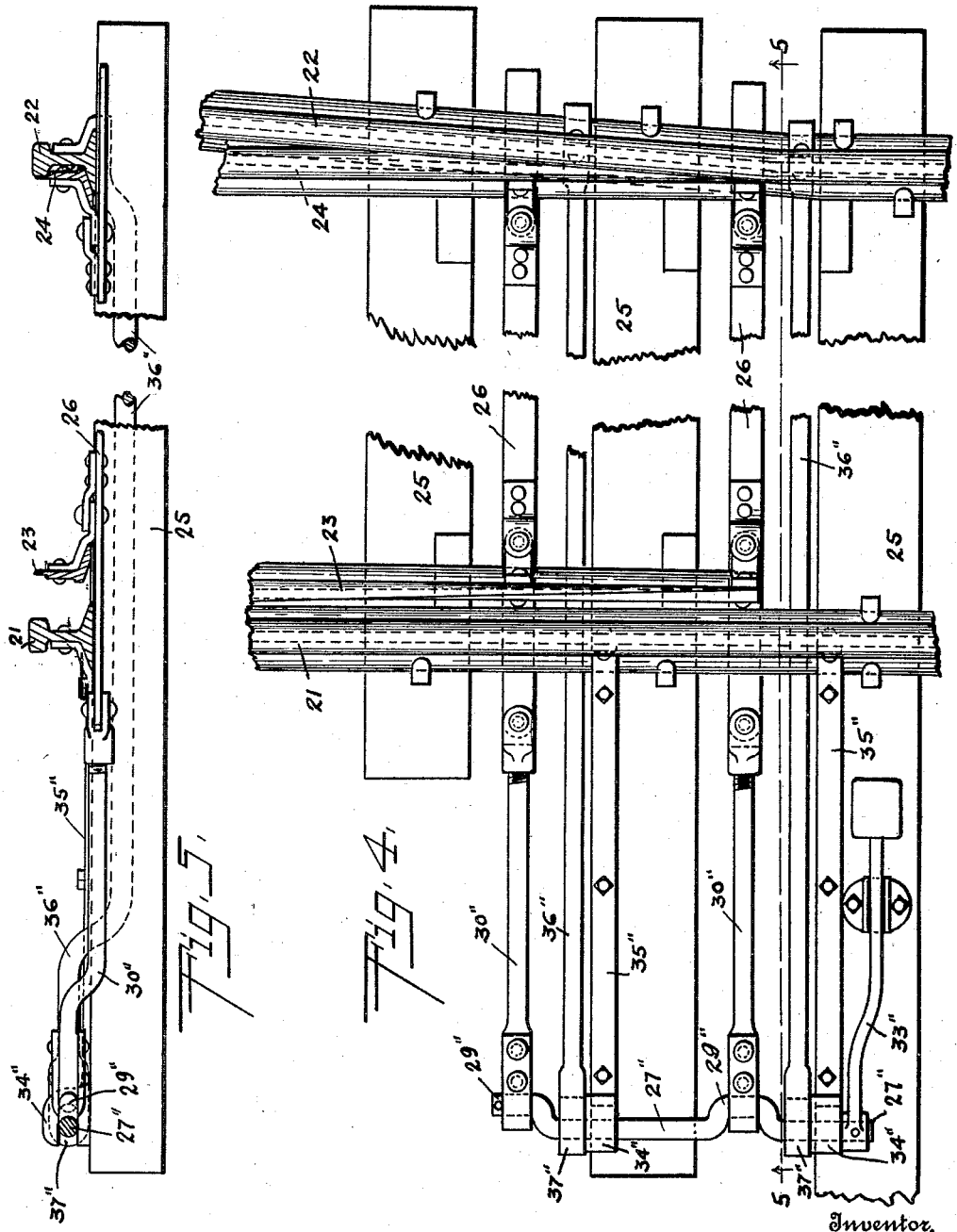

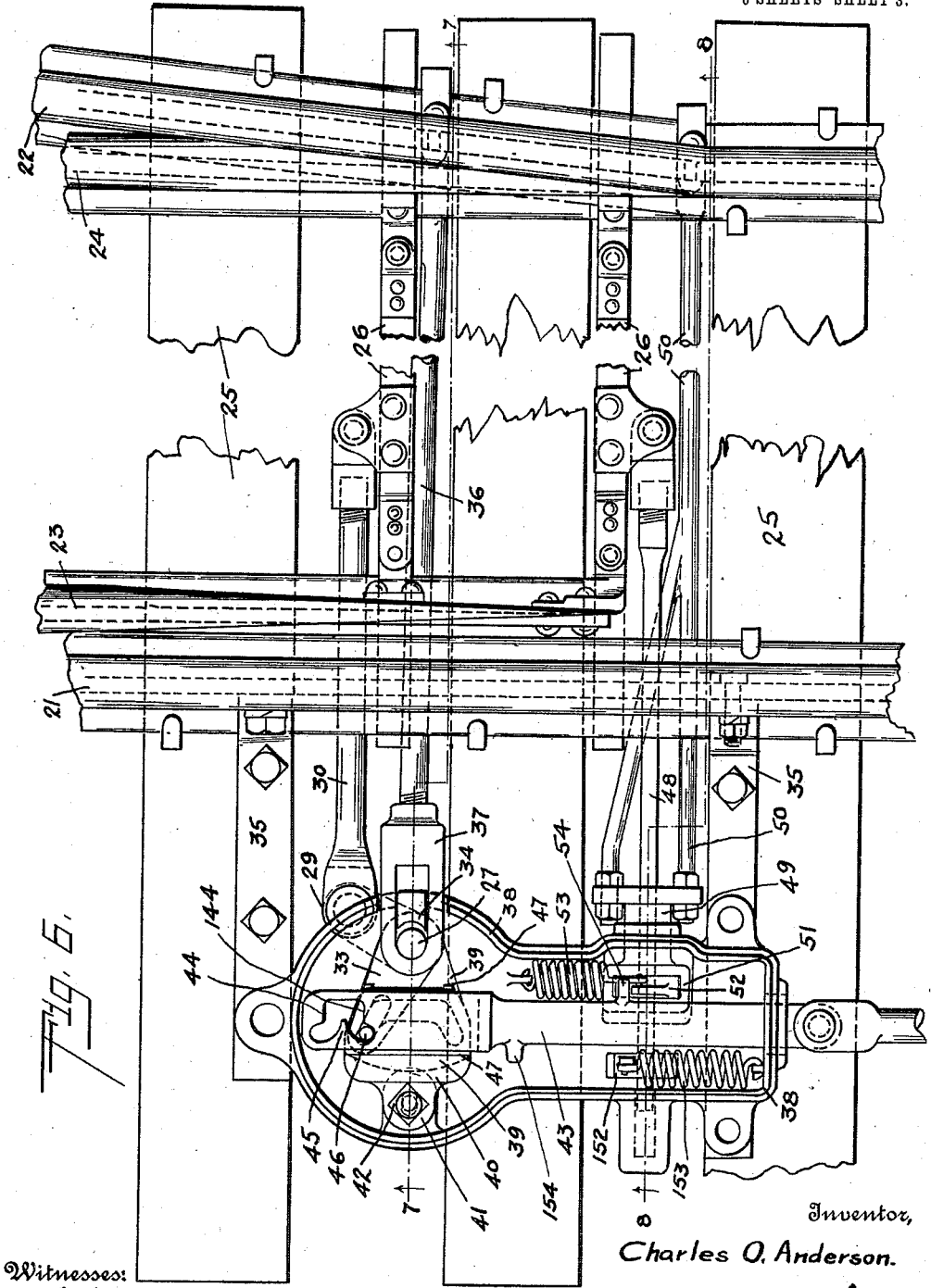

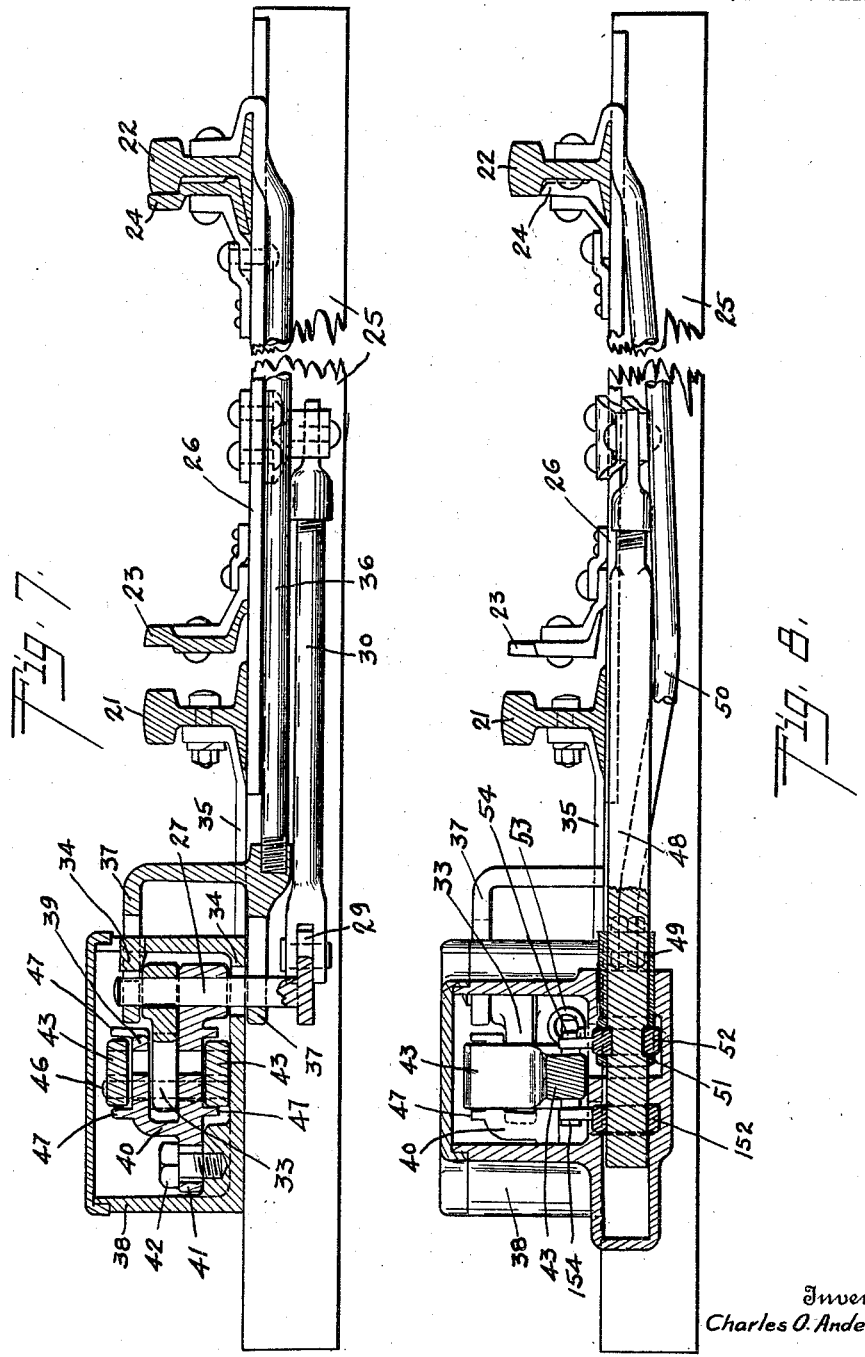

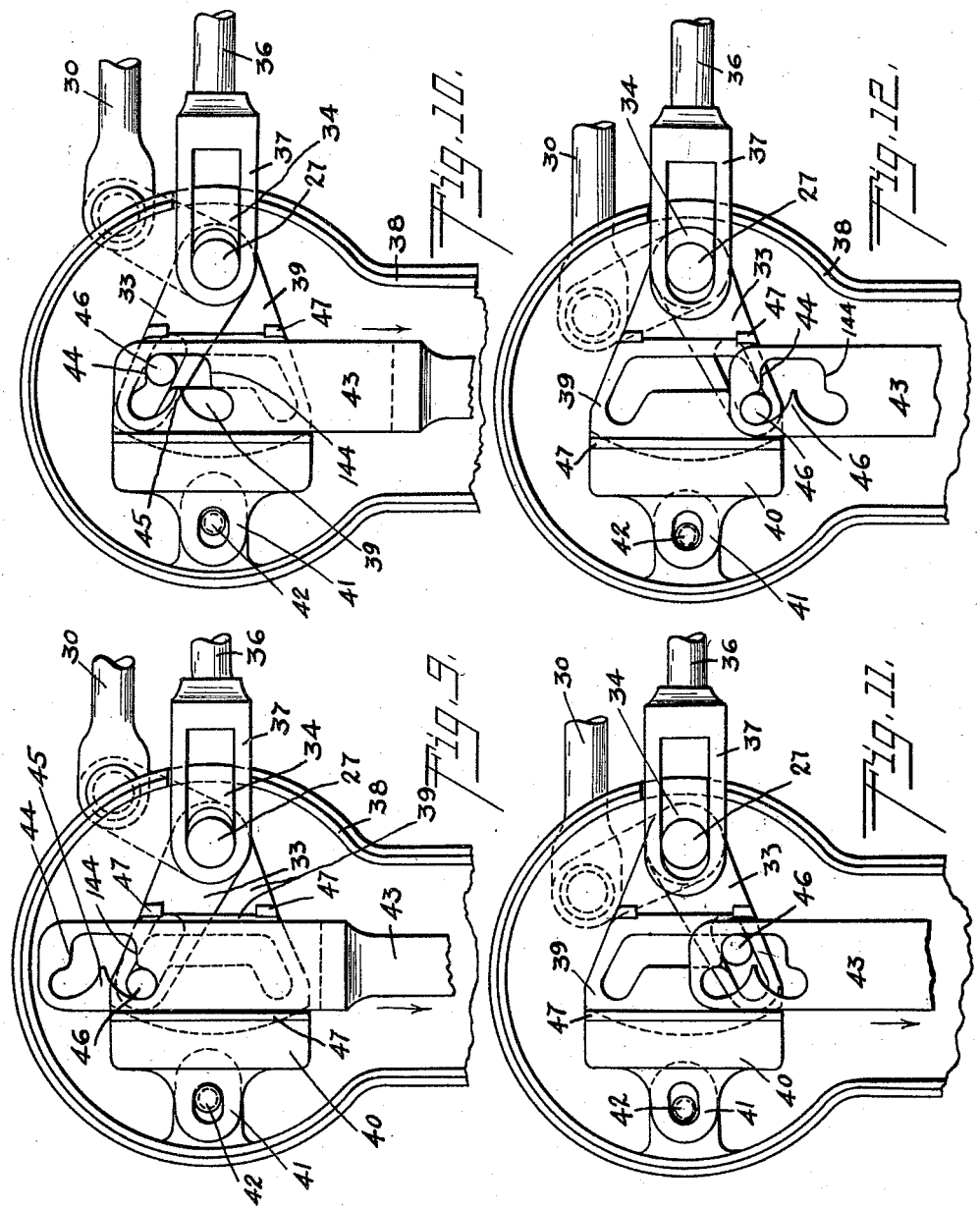

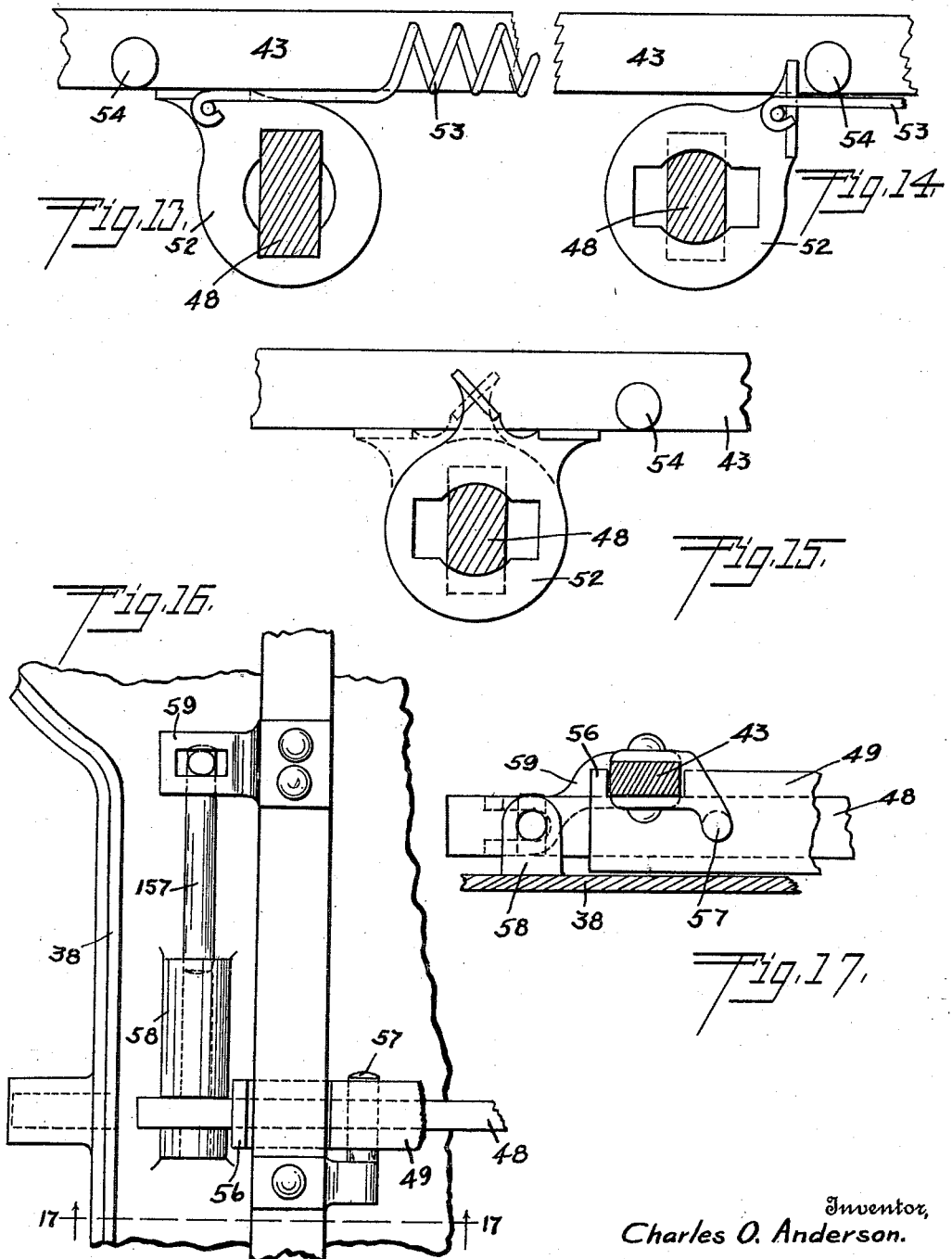

CHARLES O. ANDERSON, OF OMAHA, NEBRASKA, ASSIGNOR OF TWO-THIRDS TO A. T. AUSTIN, OF OMAHA, NEBRASKA.

RAILWAY-SWITCH.

1,005,790.  Specification of Letters Patent.  Patented Oct. 17, 1911.

Application filed December 28, 1910. Serial No. 599,726.

*To all whom it may concern:*

Be it known that I, CHARLES O. ANDERSON, a citizen of the United States, and a resident of Omaha, in the county of Douglas and State of Nebraska, have invented certain new and useful Improvements in Railway-Switches, of which the following is a specification.

My invention relates to railway switches, more particularly to hand-operated switches, and especially to switches of this class adapted to be operated from a distance, as from a signal tower.

An object of my invention is to provide a switch-actuating mechanism with which, by uniform movements of the primary actuating means, variable movements of the switch-points may be caused, the distance of movement of the switch-points being automatically determined by the relative positions or gage of the stock-rails, the movement being reduced when the distance between the stock-rails is less than the normal, and the movement being increased when the distance between the stock-rails is greater than the normal.

A further object of my invention is to provide means for positively locking the switch-points in operative relation with that one of the stock-rails toward which they are moved in any operation of the actuating means, so that subsequently to the locking any variation in the relative position of the stock-rails will not change the relation of the switch-points and the stock-rail with which they are desired to be in operative relation.

A still further object of my invention is to provide means by which, in a switch operated from a distance, any movement of the switch-points relative to the stock-rail with which they are in operative relation must commence at the operating-rod, the first part of the movement of the operating-rod being utilized for releasing the locking device at the switch, a subsequent part of the movement utilized for moving the switch-points to the desired position, and the last part of the movement used for locking or permitting the locking of the switch-points in the position to which they have been moved.

In the accompanying drawings, Figure 1 is an elevation of a stand-switch having a part of my invention applied thereto, Fig. 2 is a detail plan view of the switch-stand, Fig. 3 is a detail horizontal sectional view of the switch-stand on the plane of the line 3—3 of Fig. 1, Fig. 4 is a plan view of a ball-throw switch having a part of my invention applied thereto, Fig. 5 is a transverse vertical sectional view taken in the plane of the line 5—5 of Fig. 4, Fig. 6 is a plan view of mechanism embodying my invention as adapted for a switch to be operated from a distance, Fig. 7 is a vertical sectional view taken on the plane of the line 7—7 of Fig. 6, Fig. 8 is a vertical sectional view taken on the plane of the line 8—8 of Fig. 6, Figs. 9, 10, 11 and 12 are detail views illustrating the operation of the release mechanism or devices for permitting the unlocking and locking of the switch-points by movement of the operating-rod before and after that part of its movement used for moving the switch-points, Figs. 13 and 14 are side views showing the operation of the locking disks, Fig. 15 is a similar view showing a modified form of the locking-disks, in which the same are positively moved both to locking and release positions, Fig. 16 is a plan view of a pin or plunger locking device, and Fig. 17 is a transverse section of the same on the plane of the line 17—17 of Fig. 16.

In the construction of a switch in accordance with my invention, the stock-rails 21 and 22 and switch-points 23 and 24 may be of ordinary form and arrangement; the stock-rails being secured to ordinary wood ties 25 and the switch-points being held in uniform spaced relation to each other by spreader-bars 26, as shown.

It may be noted that in standard railway practice wood ties are almost universally employed and are considered preferable for the reason that they permit a slight yielding of the track which tends to absorb shocks and prevent breaking of the rails. Such construction, however, necessarily permits more or less variation in the gage of the track and, with switches in which the movement of the points is uniform, a slight spreading of the rails will result in the points not being brought to and held in proper engagement with the rails, while a movement of the rails toward each other, making the gage of track less than the normal, will prevent the switch-lever being moved around sufficiently to enable it to be locked.

In the construction of a switch mechanism in accordance with my invention the actuating devices are so constructed as to give an available movement to the switch-points sufficient to move them from operative relation with one stock-rail to a similar relation with the other stock-rail when the rails are spread the maximum amount permissible more than the normal gage of the track. The bearings of the actuating-shaft are so arranged that when the gage of the track is normal or any amount less than the maximum, the excess of movement of the actuating element is not employed in actuating the switch-points but is lost in the bearing of the actuating-shaft, the said bearing being divided and each half of the same being rigidly connected with one of the stock-rails but not connected with the other stock-rail except through the ties which as before mentioned, are more or less yieldable or non-rigid and permit a certain relative movement of the stock-rails.

In Figs. 1, 2 and 3, the actuating-shaft 27' is disposed vertically in the switch-stand 28, the lower end of the shaft carrying an arm 29' which is connected with the throw-rod 30' which extends to and is connected with the switch-points through the spreader-bar 26. The head 31 of the switch-stand is provided with notches arranged at right angles to each other and adapted to receive the handle 32 which is articulated to the arm or switch-lever 33' in the manner usual in switch-stands of this type. The upper bearing of the shaft 27' in the switch-stand is made sufficiently loose to permit a slight tilting of the shaft, as shown by the dotted lines in Fig. 1. The lower bearing for the shaft is made in two parts of which one is formed by hooks 34' integral with the switch-stand, as shown clearly in Fig. 3. By means of the bar 35' the switch-stand is rigidly connected with the inner stock-rail 21, the stock-rail nearest to the switch-stand being so designated. The other part of the bearing is formed in the forked end portion or head of a bar 36' which extends across the track and is connected with the outer stock-rail 22. In the forked head 37' of the rod 36' are formed slots through which the shaft 27' passes. The relation of the head 37' and bearing-hooks 34' is determined by the relative position of the stock-rails, the relation of the said parts being approximately as shown in Fig. 3 when the stock-rails are in their normal relation to each other. Referring to said figure it will be seen that when in the said relation the lower bearing of the shaft 27' is elongated so that a slight movement of the shaft is permitted in a direction transverse to the stock-rails. It will also be seen that should the distance between the stock-rails be increased the transverse movement permitted to the shaft will be decreased a corresponding amount. In Figs. 1 and 3 the parts of the mechanism are shown with the switch-points held in operative relation with the outer stock-rail, and when in this position the actuating-shaft 27' is in engagement with the end of the slot in the head 37'. When the switch-lever 33' is turned to move the points toward the inner stock-rail a pull is exerted by the arm 29' upon the throw-rod 30', and the shaft 27' is thereby pulled over into engagement with the hooks 34', so that when the movement is completed the parts are in the positions shown by dotted lines in said Fig. 3, the switch-points being connected through the throw-rod 30', arm 29', actuating-shaft 27', bearing-hooks 34', switch-stand 28 and bar 35' to the inner stock-rail 21 in such manner that the operative relation of the switch-points and said inner stock-rail will not be changed by any change which may occur in the relative positions of the two stock-rails. The actuating-shaft being always turned through the same angle, the movement of the switch-lever is uniform and the lever-handle may always be engaged in the same notches in the head 31 of the stand, yet the movement imparted to the switch-points is variable and the variation is controlled automatically by the stock-rails so that movement of the points is always the exact amount required to move them from operative relation with one stock-rail to a similar relation with the other stock-rail.

The same principle of construction is shown in Figs. 4 and 5 as applied to a switch mechanism of the "ball-throw" type. Here the actuating-shaft 27" is formed with integral cranks 29" having the throw-rods 30" connected therewith. The switch-lever 33" connected with the actuating-shaft, is provided at the end with a weight or ball from which the mechanism derives its designation as a ball-throw switch. In moving the switch-points from one operative position to the other the actuating-shaft is given one-half of a revolution instead of the quarter-revolution given to the actuating-shaft in the structure first described. The bearings of the actuating-shaft are divided, one part of the same being formed in the heads 37" of the rods 36" which are connected to the outer stock-rail, and the other part being formed by the hooks 34" on the bars 35" which are connected to the inner stock-rail. The operation of the ball-throw switch is similar to that of the stand-switch first described, except that the actuating-shaft 27" is movable as a whole in a direction transverse to the stock-rails instead of being tiltable as is the actuating-shaft 27' of the stand-switch.

Coming now to the structure of a switch mechanism for operation from a distance, as from a tower; instead of the switch being held in place by merely locking the lever which is moved by hand to throw the switch-points, it is desirable to provide locking devices operating in direct connection with the switch-points; since in a mechanical connection of considerable length, such as a rod there is a possibility of material variation in its length by expansion and contraction from changes of temperature, by lateral bending of the rod between its guides, and by wear in the joints of any articulated members in the connection; and should such variation occur in the connection between the locking devices and the switch-points, the latter would be permitted to move out of operative relation with the stock-rails. Switch mechanism embodying my invention and having locking devices of this type, is shown in Figs. 6 to 14, inclusive. In the said structure the actuating-shaft 27 is arranged vertically and carries at its lower end a crank or arm 29 which is connected, through the throw-rod 30 and one of the spreader-bars 26, with the switch-points. The bearings for the shaft are divided, one half of each being formed in the head 37 of the rod 36, the said head being slotted to pass around the shaft, and the rod 36 being extended across the track and connected to the outer stock-rail. The other halves of the bearings are formed by the lugs 34 which extend inwardly from the side of the casing 38, which is connected with the inner stock-rail by bars 35, as shown. The head 37 is forked, the upper part thereof extending through the side of the casing 38 and the lower part passing below the casing. Within the casing the shaft 27 has secured thereto the arm 33 by which the shaft is turned to actuate the throw-rod and the switch-points. The arm 33 has a slot therein which extends radially to the shaft 27, and the arm is movable in a horizontal plane between the cam-plates 39 which are formed integrally with each other, having a connecting portion 40 beyond the end of the arm 33. An extended portion of the lower plate passes around the shaft 27 below the arm 33, and at the opposite side of the plate is a lug 41 having therein a slot extending radially to the shaft. Through said slot passes a screw 42, which is threaded into the casing and which serves as a guide to prevent rotation of the cam-plates around the shaft and permit the shaft to move the plates relatively to the casing. In each of the plates 39 is a cam-slot of which the end portions extend radially to the shaft 27 and the central portion is parallel to the line of movement of the operating-rod 43. Above and below the plates 39 are portions of the operating-rod 43, of which the end is forked, and which extends out through the end of the casing 38 in a direction parallel with the stock-rails, being continued to the signal tower or other point from which the switch is to be operated. The forked end portions of the operating-rod each has therein a lyrate slot having a main central portion extending longitudinally of the rod and ending in shoulders or abutments 44 and 144, and arcuate end portions between which a pointed lug 45 extends in toward the main slot, as shown. A pin or roller 46 extends vertically through the slots in the rod 43, the plates 39 and the arm 33. When the switch-points are in operative relation with the outer stock-rail the parts are in the positions shown in Figs. 6 and 9. By movement of the operating-rod in the direction indicated in the latter figure, the roller 46 is first engaged by the curved side of the lug 45 by which it is pulled against the side of the cam-slot and thereby directed into the main or longitudinal parts of both the cam-slot and lyrate slot, at the same time moving along the slot in the arm 33 radially of the shaft 27. Thus at the conclusion of this phase of movement of the rod the parts are in the positions shown in Fig. 10, the roller engaging the shoulder 44, and the rod 43 having moved longitudinally the distance indicated without actuating the arm 33. In the next phase of movement of the operating-rod the roller passes along the central portion of the cam-slots, and the arm 33 is turned so that the position of the parts is as shown in Fig. 11. Continued movement of the operating-rod causes the roller to move radially to the shaft 27 through the slot in the arm 33 and the end portions of the cam-slots in the plates 39. The said movement being transverse to the operating-rod, the roller is thereby disengaged from the shoulder 44 so that it passes into the end portion of the lyrate slot, and at the conclusion of the movement of the operating-rod the parts are in the relative positions shown in Fig. 12. Movement of the operating-rod in the opposite direction causes a similar operation of the parts in reversed directions.

It will be observed that the shifting of the center of the actuating-shaft 27, to vary the throw of the switch-points proportionally to the gage of the stock-rails, may occur in the same manner as in the stand-switch and ball-throw switch before described. It may also be noted that such shifting of the shaft 27 in its bearings does not change the relation of the slots in the arm 33, plates 39 and operating-rod 43, since the cam-plates 39 are connected with the shaft so as to move transversely therewith, and the rod 43 is guided between lugs 47 on the plates 39, so as to be held in fixed transverse relation thereto. The described mechanism also serves, in addition to the purposes before mentioned, as a locking device to prevent relative movement between the switch-points and the stock-rail with which they are in operative relation, since the arm 33 and actuating-shaft cannot be turned until the pin 46 is in the central portion of the cam-slots in the plates 39, and the pin cannot be moved into said portion of the cam-slots without a considerable longitudinal movement of the operating-rod being first made. Additional and more positive and direct locking devices are provided, however, as follows: To the spreader-bar 26 which connects the ends of the switch-points, is connected the locking-rod 48 which extends into the casing 38 below the rod 43. At the inner side of the casing and surrounding the locking-rod is a sleeve 49 which is connected by means of the forked rod 50 with the outer stock-rail, so that change in the relation of the two stock-rails will cause a similar change in the relation of the said sleeve and the casing 38 which, as before mentioned, is connected with the inner stock-rail by the bars 35. At the inner end of the sleeve 49 is a stirrup 51 within which is disposed the locking-disk 52, the said disk having a rectangular axial opening therein through which the locking-rod passes. A similar disk 152 is disposed around the locking-rod at the opposite side of the rod 43 and within a recess or pocket formed in the casing, as shown in Fig. 8. In that portion of the locking-rod which passes through the disks, notches are made in the opposite edges thereof, thereby reducing the cross section of the rod at the notches to an extent such that when the notches and one of the disks coincide the disk may be rotated upon the reduced portion of the rod. Springs 53 and 153 are connected with the disks and tend to turn them from the position shown in Fig. 13, in which the rectangular part of the opening through the disk coincides with the rod, to the position shown in Fig. 14, in which the rectangular part of the opening through the disk is turned at right angles to the former position, the body of the disk lying in the notches of the rod so as to prevent longitudinal movement of the rod relative to the disk. On each of the disks is a lug having a face tangential to the disk, the lug being adapted to extend up alongside the rod 43 so that the tangential face thereof may be engaged by one of the pins 54 and 154 which extend laterally from the said rod 43. The locking devices are so arranged that when the switch-points are in operative relation with the outer stock-rail as shown in Fig. 1, the notches in the locking-rod coincide with the disk 52 which is turned by the spring 53 to the position shown in Fig. 14. The said disk 52 being held by the stirrup 51 and connected with the outer stock-rail through the sleeve 49 and rod 50, the switch-points are, in effect, locked to the stock-rail. Now when the rod 43 is moved longitudinally the lug on the disk is engaged by the pin 54 and the disk is turned to the position shown in Fig. 13, the said movement of the disk occurring during the part of the rod movement between the positions shown in Figs. 9 and 10. After the disk has been turned to the said position and while it is held at such position by the engagement of the pin 54 with the tangential face of the lug, the movement of the switch-points is commenced, and, such movement being communicated to the locking-rod, the notches in the rod are moved out of coincidence with the disk so that when the pin 54 passes out of engagement with the lug the spring 53 cannot cause the return of the disk to locking position. At the completion of the movement of the switch-points, when the same are in operative relation with the inner stock-rail, the notches in the locking-rod are brought into coincidence with the disk 152 which is turned by the spring 153 to locking position. The disk 153 being held in the casing 38 which is connected with the inner stock-rail by the bars 35, the switch-points are thereby locked against displacement from the said inner stock-rail. Movement of the actuating-rod 43 in the opposite direction engages the pin 154 with the disk 152 which is thereby turned and caused to release the locking-rod in the same manner as the disk 52.

If desired, instead of having the locking-disks moved to locking position by the action of springs, the disks may be positively actuated in both directions by the pins on the sides of the rod 43. Such an arrangement is illustrated in Fig. 15, the locking-disk being provided with two lugs, one of which is engaged by the pin on the rod 43 when the same is moved in either direction.

A further modification of the locking devices is shown in Figs. 16 and 17. In this construction the inner end of the sleeve 49 is provided with a jaw 56 forming a recess in which is disposed the rod 43 so that the rod is held in uniform transverse relation to the sleeve. In the sleeve and locking-rod are formed transverse openings which coincide when the switch-points and the outer stock-rail are in operative relation, and a pin 57 carried by the rod 43 is adapted to pass through said transverse openings as shown in Fig. 16, to secure the sleeve and locking-rod in fixed relation to each other. A pin 157 is slidably held in lugs 58 formed on the casing 38, the said pin being connected with the operating-rod 43 by means of a forked and slotted finger 59. The parts are so arranged that when the switch-points and the inner stock-rail are in operative relation, the transverse opening in the rod is in alinement with the pin 157 which, by movement of the rod 43, is passed through said opening to secure the locking-rod against longitudinal movement relative to the casing 38. The locking of the switch-points in operative relation to the inner stock-rail is thus effected in the same manner as when the locking-rod is secured to the casing through the medium of the disk 152.

With ordinary switch mechanism in which the switch-points are not held in positive engagement with the stock-rails, so that movement of a stock-rail away from its switch-point may occur, it is necessary to frequently readjust the switch mechanism in order to secure a proper engagement of the switch-point with its stock-rail. When such readjustment is not made and the point is separated from the rail, the lateral pressure of the wheels in passing over the switch is received entirely by the switch-point, which is unsupported by the stock-rail. This places an excessive stress upon the locking-rod and actuating mechanism which are thus liable to be broken. With switch mechanism constructed in accordance with my invention such constant attention and readjustment is unnecessary, since the mechanism is automatically readjusted to conform to every change in the transverse relation of the stock-rails, so that each switch-point is moved into actual engagement with its stock-rail and positively held in such engagement.

Now, having described my invention, what I claim and desire to secure by Letters Patent is:

1. In a railway switch, stock-rails, switch-points, an actuating-shaft connected with the switch-points for moving them to operative relation with either stock-rail, a two-part bearing for said actuating-shaft, the parts of the bearing being normally separated to permit a movement of the shaft transversely to the stock-rails, means connecting one part of the bearing to one stock-rail, and means connecting the other part of the bearing to the other stock-rail so that spreading of the stock-rails will reduce the amount of transverse movement permitted to the shaft.

2. In a railway switch, stock-rails, switch-points, means for actuating the switch-points to operative relation with either stock-rail, said actuating means including a shaft rotatable through a uniform angle, a two-part bearing for said shaft arranged to permit movement of the shaft transversely to the stock-rails, and means connecting the bearing parts one to each stock-rail, whereby relative movement of the stock-rails will cause corresponding movement of the bearing parts.

3. In a railway switch, stock-rails, switch-points, means for actuating the switch-points to operative relation with either stock-rail, a locking-rod connected with the switch-points, means for securing the locking-rod in fixed relation to one of the stock-rails when the switch-points are in operative relation with said stock-rail, and separate means for securing the locking rod in fixed relation to the other stock-rail when the switch-points are in operative relation thereto.

4. In a railway switch mechanism, stock-rails, switch-points, means for actuating the switch-points to operative relation with either stock-rail, and separate locking devices for securing the switch-points in fixed relation with either of the stock-rails with which they are moved to operative relation.

5. In a railway switch mechanism, stock-rails, switch-points, means for actuating the switch-points to operative relation with either stock-rail, separate locking devices connected with the respective stock-rails for securing the switch-points in fixed relation to the stock-rail with which they are moved to operative relation, and means controlled by the actuating means for releasing said locking devices.

6. In a railway switch mechanism, stock-rails, switch-points, means for actuating the switch-points to operative relation with either stock-rail, means for automatically proportioning the throw of the switch-points to the gage of the stock-rails, and locking devices arranged to automatically maintain a fixed relation between the switch-points and either of the stock-rails to which the switch-points are moved to operative relation.

7. In a railway switch mechanism, stock-rails, switch-points, means for actuating the switch-points to operative relation with either stock-rail, means for automatically proportioning the movement of the switch-points to the gage of the stock-rails, locking devices adapted to automatically maintain a fixed relation between the switch-points and either of the stock-rails to which the switch-points are moved to operative relation, and means controlled by the actuating means for releasing the locking devices.

8. In a railway switch mechanism, stock-rails, switch-points, means for actuating the switch-points to operative relation with either stock-rail, the said actuating means including a shaft rotatable through a uniform angle, a two-part bearing for said shaft, a locking-rod connected with the switch-points and movable therewith, two separate locking devices each engageable with the locking-rod, means connecting one of the locking devices and one part of the actuating-shaft bearing with one of the stock-rails, and separate means connecting the other locking device and the other part of the actuating-shaft bearing with the other stock-rail.

9. In a railway switch mechanism, stock-rails, switch-points, means for actuating the switch-points to operative relation with either stock-rail, the said actuating means including a rotatable shaft, a two-part bearing for said shaft, a locking-rod connected with the switch-points and movable therewith, two separate locking devices each engageable with the locking-rod, means connecting one of said locking devices and one part of the actuating-shaft bearing with one of the stock-rails, separate means connecting the other locking device and the other part of the actuating-shaft bearing with the other stock-rail, and means operated by the actuating means for controlling the locking devices.

10. In a railway switch mechanism, stock-rails, switch-points, means for actuating the switch-points to operative relation with either stock-rail, means for automatically proportioning the movement of the switch-points to the gage of the stock-rails, a locking element connected with the switch-points and movable therewith, two separate rotary bodies engageable with the locking element, means connecting one of said rotary bodies with one stock-rail, and separate means connecting the other rotary body with the other stock-rail, each of the rotary bodies having a position at which it secures the locking element in fixed transverse relation with the stock-rail to which the respective body is connected.

11. In a railway switch mechanism stock-rails, switch-points, an actuating element, means connecting the actuating element with the switch-points, and means connecting the stock-rails with the connecting means so that when the switch-points are in operative relation with either stock-rail movement of that stock-rail will cause a similar movement of the switch-points.

12. In a railway switch mechanism stock-rails, switch-points, an actuating element, means connecting the actuating element with the switch-points, and means controlling the movement of the connecting means between the actuating element and switch-points, the said controlling means being connected with each stock-rail and being automatically variable by relative movement of the stock-rails.

13. In a railway switch mechanism, stock-rails, switch-points, an actuating element having a uniform movement, variable connecting means between the actuating element and switch-points, and means controlling the variation of the connecting means to automatically proportion the movement of the switch-points to the gage of the stock-rails.

14. In a railway switch mechanism, stock-rails, switch-points, a locking-rod connected with the switch-points, and independent means for positively connecting the locking-rod with each stock-rail.

15. In a railway switch mechanism, stock-rails, switch-points, a locking-rod connected with the switch-points, independent means for positively connecting the locking-rod with each stock-rail, and means for automatically engaging the said connecting means with the locking-rod when the switch-points are moved to predetermined relations with the respective stock-rails.

In testimony whereof I have hereunto subscribed my name in the presence of two witnesses.

CHARLES O. ANDERSON.

Witnesses:
WILSON A. AUSTIN,
M. L. HYDE.

---

Copies of this patent may be obtained for five cents each, by addressing the "Commissioner of Patents, Washington, D. C."